US012123564B2

(12) United States Patent
Matsuoka et al.

(10) Patent No.: US 12,123,564 B2
(45) Date of Patent: Oct. 22, 2024

(54) VEHICLE LAMP WITH LIGHT EMITTING PORTION-SIDE TERMINAL

(71) Applicant: Ichikoh Industries, Ltd., Isehara (JP)

(72) Inventors: Kenji Matsuoka, Isehara (JP); Kunihiro Shimizu, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/264,387

(22) PCT Filed: Feb. 8, 2022

(86) PCT No.: PCT/JP2022/004863
§ 371 (c)(1),
(2) Date: Aug. 4, 2023

(87) PCT Pub. No.: WO2022/168988
PCT Pub. Date: Aug. 11, 2022

(65) Prior Publication Data
US 2024/0093847 A1 Mar. 21, 2024

(30) Foreign Application Priority Data
Feb. 8, 2021 (JP) ................................ 2021-018046

(51) Int. Cl.
*F21S 41/19* (2018.01)
*F21S 41/143* (2018.01)
*F21S 45/48* (2018.01)

(52) U.S. Cl.
CPC ............ *F21S 41/19* (2018.01); *F21S 41/143* (2018.01); *F21S 41/192* (2018.01); *F21S 45/48* (2018.01)

(58) Field of Classification Search
CPC ........ F21S 41/19; F21S 41/192; F21S 41/143; F21S 45/48
See application file for complete search history.

(56) References Cited

U.S. PATENT DOCUMENTS 10,276,767 B2 * 4/2019 Ide ........................ H01L 25/075
2009/0140633 A1 * 6/2009 Tanimoto ............... H04N 9/315 313/503
(Continued)

FOREIGN PATENT DOCUMENTS

EP 3 260 327 A1 12/2017
EP 4 224 058 A1 8/2023
(Continued)

OTHER PUBLICATIONS

Kawai et al., Light-Emitting Device, 2016, JP2016018721A, https://worldwide.espacenet.com/patent/search/family/055233798/publication/JP2016018721A?q=pn%3DJP2016018721A (Year: 2016).*
(Continued)

*Primary Examiner* — Tracie Y Green
*Assistant Examiner* — Michael Chiang
(74) *Attorney, Agent, or Firm* — Oblon, McClelland, Maier & Neustadt, L.L.P.

(57) ABSTRACT

To provide a vehicle lamp in which it is possible to prevent a bonding wire from blocking light emitted from a light emitting surface while improving heat dissipation performance from a light emitting portion. A vehicle lamp includes a light emitting portion having a light emitting element, a circuit board, and a heat sink. In this vehicle lamp, a front region of the heat sink is divided into a first region and a second region, the light emitting portion is fixed to the first region, and the circuit board is fixed to the second region. A light emitting portion-side terminal provided in the light emitting portion and a board-side terminal provided in the circuit board are electrically connected by a bonding wire. The light emitting portion-side terminal is disposed between a light emitting surface that covers the light emitting element, and the board-side terminal in front view.

6 Claims, 7 Drawing Sheets

(56) References Cited

U.S. PATENT DOCUMENTS

| | | | | |
|---|---|---|---|---|
| 2010/0148196 | A1* | 6/2010 | Kamada | F21K 9/00 257/E33.056 |
| 2011/0133217 | A1* | 6/2011 | Hakamata | F21S 41/155 257/E33.057 |
| 2022/0057060 | A1* | 2/2022 | Droegeler | F21S 43/15 |

FOREIGN PATENT DOCUMENTS

| | | | | |
|---|---|---|---|---|
| EP | 4 224 059 | A1 | | 8/2023 |
| JP | 2007-116109 | A | | 5/2007 |
| JP | 2010-524210 | A | | 7/2010 |
| JP | 2016-18721 | A | | 2/2016 |
| JP | 2016018721 | A | * | 2/2016 |
| JP | 2019-169358 | A | | 10/2019 |
| WO | WO 2013/153938 | A1 | | 10/2013 |
| WO | WO 2022/113948 | A1 | | 6/2022 |

OTHER PUBLICATIONS

International Search Report Issued Apr. 19, 2022, in PCT/JP2022/004863, filed on Feb. 8, 2022, 2 pages.
Extended European Search Report issued May 7, 2024, in corresponding European Patent Application No. 22749859.9, 92 pages.
Japanese Office Action mailed Jul. 2, 2024 in Japanese Patent Application No. 2021-018046, w/English translation, 8 pages.

* cited by examiner

VEHICLE LAMP WITH LIGHT EMITTING PORTION-SIDE TERMINAL

TECHNICAL FIELD

The present disclosure relates to a vehicle lamp.

BACKGROUND ART

There is known a conventional semiconductor optical module that is mounted with a semiconductor light source on a disk-shaped module having a conductive surface and having a good heat transfer property, and that has a control electronic device integrated therein, in which the control electronic device is disposed around the semiconductor light source, the control electronic device is composed of a circuit board having at least two conductor path surfaces, the first conductor path surface is directed outward in the direction of light radiation in an assembled state and the second conductor path surface is surrounded by an enclosed cavity provided in the module (see PTL 1, for example).

CITATION LIST

Patent Literature

PTL 1: Japanese Unexamined Patent Application Publication No. 2010-524210

SUMMARY OF THE INVENTION

Problems to be Solved by the Invention

The conventional semiconductor optical module electrically connect the semiconductor light source to the circuit board, but how to connect the semiconductor light source to the circuit board specifically is not disclosed. Therefore, when the semiconductor light source and the circuit board are electrically connected with a bonding wire, there is a risk that the bonding wire set up by bonding to two distant terminals may block light emitted from a light emitting surface of the light source.

An object of the present disclosure is to provide a vehicle lamp in which it is possible to prevent a bonding wire from blocking light emitted from a light emitting surface.

Means for Solving the Problem

In order to achieve the above object, a vehicle lamp of the present disclosure includes a light emitting portion having a light emitting element, a circuit board, and a heat sink. In this vehicle lamp, a front region of the heat sink is divided into a first region and a second region, the light emitting portion is fixed to the first region, and the circuit board is fixed to the second region. A light emitting portion-side terminal provided in the light emitting portion and a board-side terminal provided in the circuit board are electrically connected by a bonding wire. The light emitting portion-side terminal is disposed between a light emitting surface that covers the light emitting element, and the board-side terminal in front view.

Effect of the Invention

Accordingly, it is possible to prevent a bonding wire from blocking light emitted from a light emitting surface while improving heat dissipation performance from a light emitting portion.

MODE FOR CARRYING OUT THE INVENTION

Figure 1:
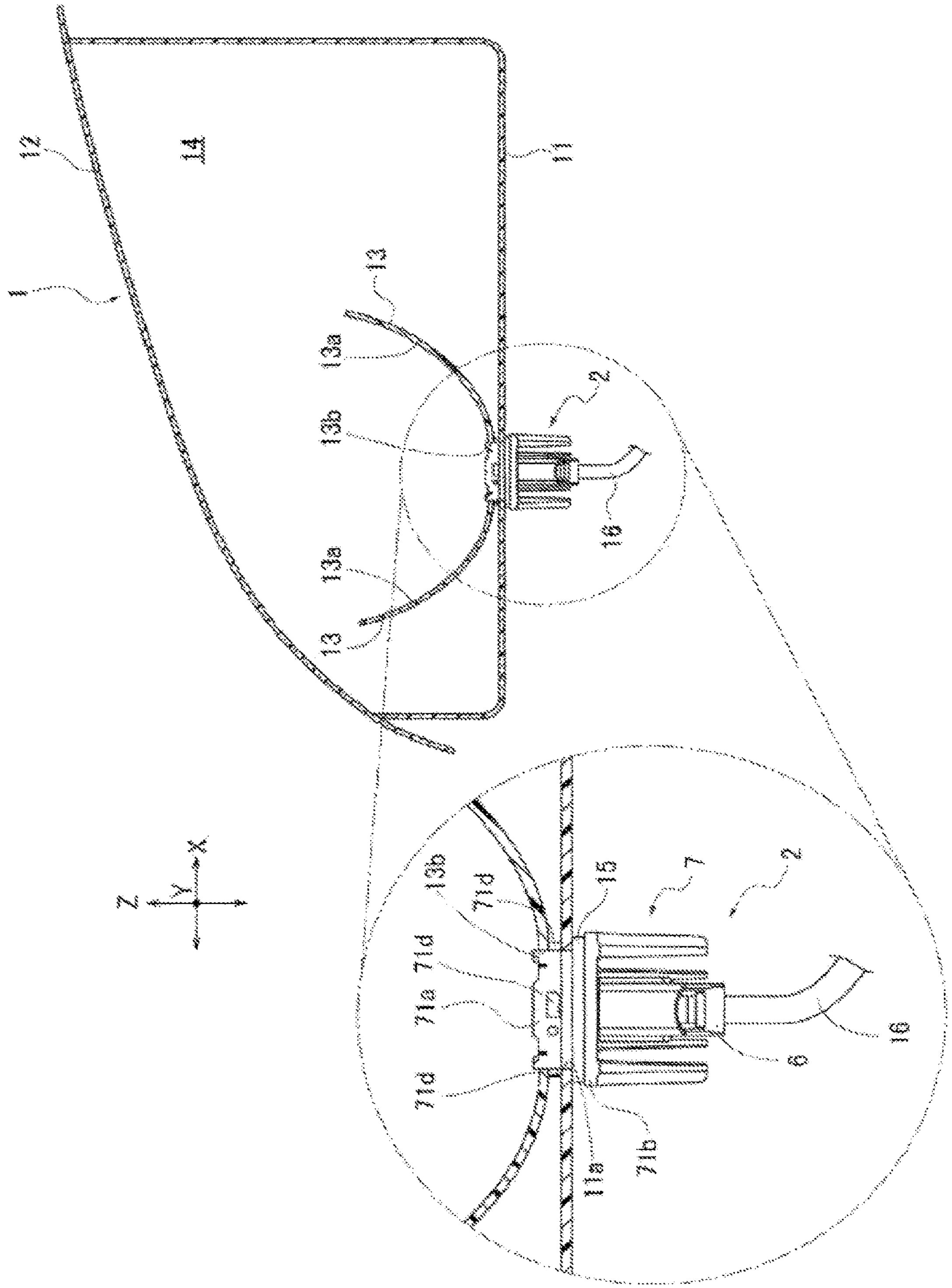
FIG. 1 is an explanatory diagram illustrating a vehicle lamp of the present disclosure.

Hereinafter, a mode for carrying out a vehicle lamp according to the present disclosure will be described on the basis of Embodiment 1 illustrated in the drawings.

Embodiment 1

A vehicle lamp 1 in Embodiment 1 is used as a lamp for a vehicle such as an automobile, and is applicable, for example, to a head lamp, a fog lamp, a daytime running lamp, a clearance lamp, a rear lamp and the like. In the following description, in the vehicle lamp 1, the direction in which a vehicle travels straight ahead (front-rear direction) and light is emitted is defined as the optical axis direction ("Z" in the drawing, and the direction of emission is defined as the front side), the vertical direction when mounted on the vehicle is defined as the up-down direction ("Y" in the drawing), and the direction orthogonal to the optical axis direction and the up-down direction (left-right direction) is defined as the width direction ("X" in the drawing). A configuration of Embodiment 1 will be divided into an "overall configuration", a "light source unit configuration", and an "essential configuration" to be described below.

With reference to FIG. 1, the overall configuration will be described. The vehicle lamp 1 includes a lamp housing 11, a lamp lens 12, a reflector 13, and a light source unit 2, as illustrated in FIG. 1.

The lamp housing 11 is formed of a light impermeable material such as a colored or painted resin material, and is hollow with an opened front side and a blocked rear side. In the lamp housing 11, an attachment hole 11*a* that passes through a blocked rear end is provided. In an edge of the attachment hole 11*a*, a plurality of cutout portions and stopper portions are provided at substantially equal intervals.

The lamp lens 12 is formed of a light-transmitting member such as a transparent resin member and a glass member, and is shaped in such a shape that an opened front end of the lamp housing 11 can be covered. The lamp lens 12 is fixed to an opening of the lamp housing 11 in a sealed state, and water-tightness is ensured. A lamp chamber 14 is formed by sectioning by the lamp housing 11 and the lamp lens 12.

The reflector 13 is a light distribution control unit that controls light distribution of emission light emitted from the light source unit 2, and is fixed to the lamp housing 11 and the like. The reflector 13 is disposed in the lamp chamber 14. The reflector 13 is formed in a curved shape with a focal point near the light emitting portion 31 (described below) of the light source unit 2. The reflector 13 has a reflective surface 13*a* which is an inner surface that reflects light, and is provided with an attachment hole 13*b* at a bottom. The attachment hole 13*b* has such a positional relationship as to communicate with the attachment hole 11*a* of the lamp housing 11 in a state in which the reflector 13 is disposed in the lamp chamber 14. The reflector 13 is formed as a separate member from the lamp housing 11, but may have an integral configuration, that is, the inner surface of the lamp housing 11 being a reflective surface, or may have other configuration. Instead of the reflector 13 (reflective surface 13*a*), a light guide member may be provided on the front side in the optical axis direction of the light source unit 2 to emit light at a different position or in a different size region from the light emitting portion 31, and is not limited to the configuration of Embodiment 1. Thus, even with such a light guide member, the vehicle lamp 1 can be used, for example, as a headlamp, a fog lamp, a daytime running lamp, a clearance lamp, or the like.

The light source unit 2 is disposed in the lamp chamber 14 through the attachment hole 11*a* of the lamp housing 11 and the attachment hole 13*b* of the reflector 13. The light source unit 2 is removably attached to the attachment hole 11*a* of the lamp housing 11 with a sealing member 15 (an O-ring, a rubber packing) between the light source unit 2 and the lamp housing 11. The light source unit 2 may be provided in the lamp chamber 14 via a vertical optical axis adjustment mechanism and a horizontal optical axis adjustment mechanism.

A socket 7 of the light source unit 2 includes a power source-side connector 6 to which a harness 16 is connected. A socket main body 71 of the socket 7 has a peripheral wall 71*a*, a flange wall 71*b*, and attachment protrusions 71*d*.

Now, a configuration of the light source unit 2 will be described with reference to FIG. 2 to FIG. 4. The light source unit 2 is a socket type module that integrates a light source 3, a heat sink 4, a light source-side connector 5, the power source-side connector 6, and the socket 7 in a compact manner (see FIG. 1 and FIG. 3).

Figure 2:
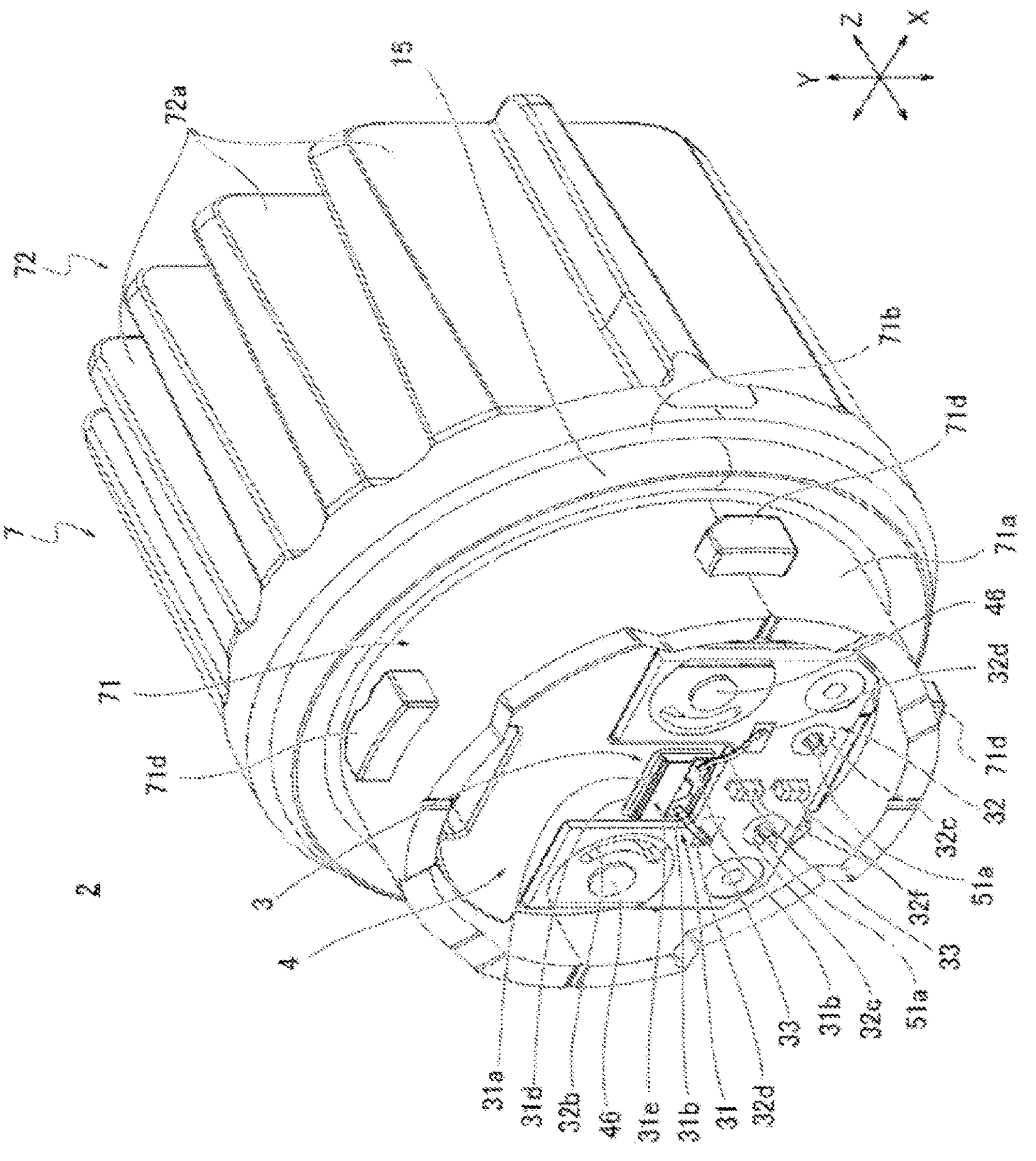
FIG. 2 is a front perspective view illustrating a light source unit of the present disclosure.
Figure 3:
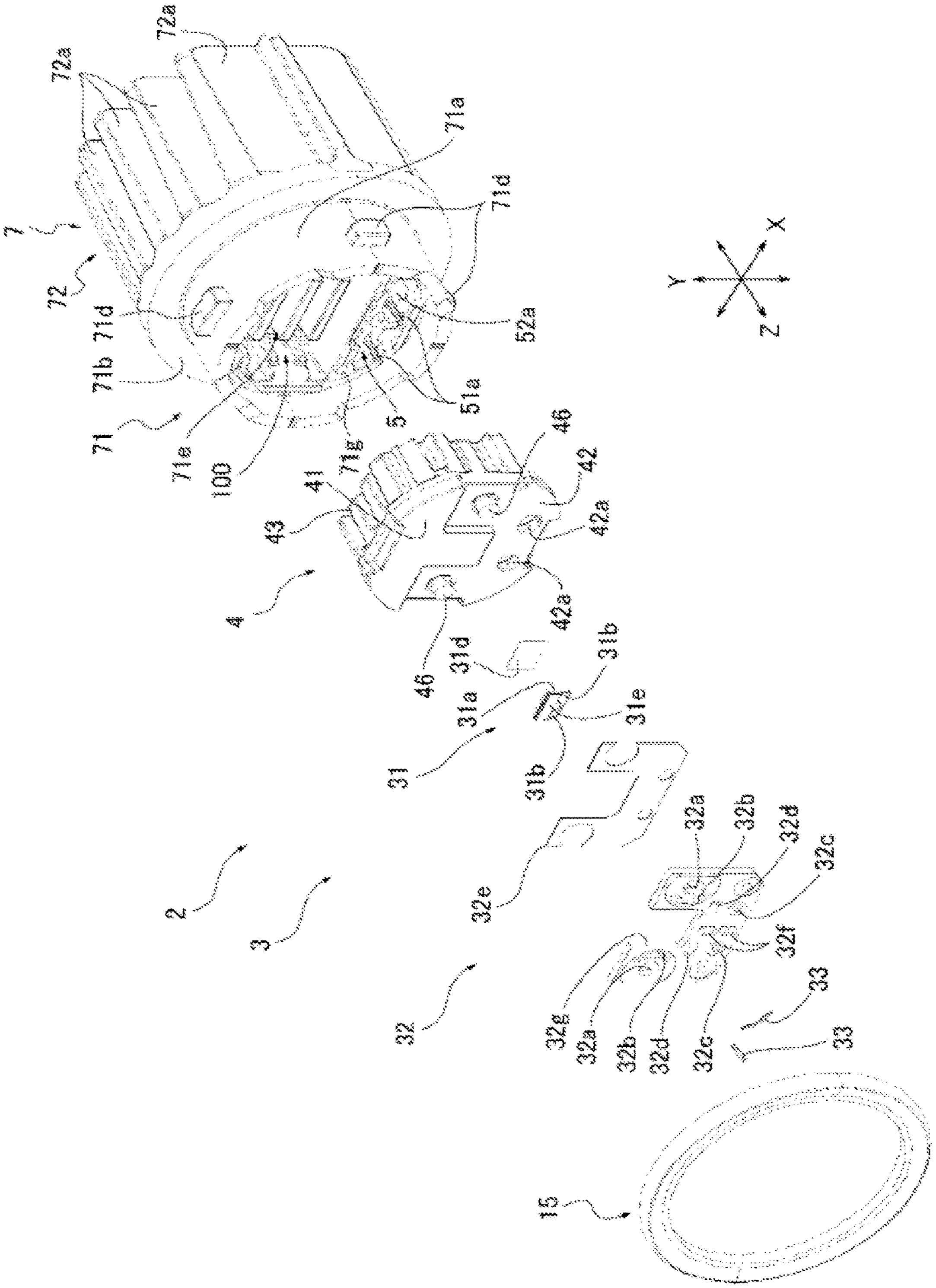
FIG. 3 is a front exploded perspective view illustrating the light source unit of the present disclosure.

As illustrated in FIG. 2 and FIG. 3, the light source 3 has the light emitting portion 31, a circuit board 32, and a pair of bonding wires 33.

The light emitting portion 31 emits light by applying a drive voltage from the circuit board 32 to a light emitting element, and is fixed directly at the central position of a front region when the front surface of the heat sink 4 is viewed from the optical axis direction. The light emitting portion 31 has a submount substrate 31*a*, a pair of light emitting portion-side terminals 31*b*, light emitting chips 31*c*, a thermally conductive adhesive layer 31*d*, and a light emitting surface 31*e*. A configuration of the light emitting portion 31 will be below described in detail.

The circuit board 32 produces a drive voltage to be applied to the light emitting portion 31 on the basis of a control command from a lamp control circuit (not illustrated) installed in the vehicle, and is fixed directly to a front region in the optical axis direction of the heat sink 4, excluding a region where the light emitting portion 31 is fixed. The circuit board 32 is provided with a semiconductor device drive circuit with capacitors 32*f* and other components. In addition, the circuit board 32 includes a pair of caulking hole portions 32*a*, a pair of curved hole portions 32*b*, a pair of terminal connection hole portions 32*c*, a pair of board-side terminals 32*d*, and an adhesive sheet 32*e*. A detailed configuration of the circuit board 32 will be described below.

Each bonding wire 33 is an electrically conductive metal conductor, and both ends of the wire are bonded to the light emitting portion-side terminal 31*b* and the board-side terminal 32*d* by a wire bonding technology using ultrasonic vibration. The detailed configuration of the bonding wires 33 will be described below.

The heat sink 4 is a heat dissipation member that transfers heat generated by the light emitting portion 31 to the socket 7, and is formed by die-cast aluminum with high thermal conductivity. As illustrated in FIG. 3 and FIG. 4, the heat sink 4 integrally has a first region 41, a second region 42, a fin portion 43, and a pair of positioning protrusion portions 46. The heat sink 4 may be formed of other metal material with high thermal conductivity or a resin material with high thermal conductivity.

The first region 41 is a surface to which the light emitting portion 31 is directly fixed, and is formed in an upper region of the front region when the front region of the heat sink 4 is divided into two regions, as illustrated in FIG. 3. The first region 41 is flat and has a higher surface protruding in the optical axis direction with respect to the second region 42. A detailed configuration of the first region 41 will be described below.

The second region 42 is a surface to which the circuit board 32 is directly fixed, and is formed in a lower region of the front region when the front region of the heat sink 4 is divided into two regions, as illustrated in FIG. 3. The second region 42 is flat and has a lower surface in the optical axis direction than the first region 41. In the second region 42, a pair of terminal insertion hole portions 42*a* are provided through in the optical axis direction. Furthermore, on the rear side viewed from the opposite side in the optical axis direction when the second region 42 is defined as the front side, a pair of first protrusions 42*b* and a pair of second protrusions 42*c* are provided, as illustrated in FIG. 4. The first protrusions 42*b* are disposed at left and right positions with a pair of the terminal insertion hole portions 42*a* interposed therebetween in the width direction. The second protrusions 42*c* are located at such left and right positions with the pair of first protrusions 42*b* interposed therebetween in the width direction. A detailed configuration of the second region 42 will be described below.

The fin portion 43 creates a heat dissipation path that transfers heat transferred from the light emitting portion 31 to the socket 7. As illustrated in FIG. 4, the fin portion 43 is provided so as to protrude rearward in the optical axis direction from the back side of the first region 41 where the light emitting portion 31 is fixed. The fin portion 43 has a plurality of parallel fins 43*a* in the horizontal direction and a plurality of connecting fins 43*b* in the up-down direction. The parallel fins 43*a* are provided in parallel by interposing predetermined intervals in the up-down direction, and the connecting fins 43*b* are provided by bridging the respective parallel fins 43*a* in the up-down direction. Therefore, the fin portion 43 is configured such that the four parallel fins 43*a* and the two connecting fins 43*b* are assembled in a grid pattern, and the parallel fins 43*a* and the connecting fins 43*b* are connected at intersections.

The positioning protrusion portions 46 caulk and fix the circuit board 32 to the heat sink 4. As illustrated in FIG. 2 and FIG. 3, a pair of the protrusions 46 are disposed in left and right positions in the width direction of the second region 42 across the first region 41. A pair of the positioning protrusion portions 46 with cylindrical shapes are inserted into a pair of the caulking hole portions 32*a* of the circuit board 32 to crush and deform tips protruding from the circuit board 32.

Figure 4:
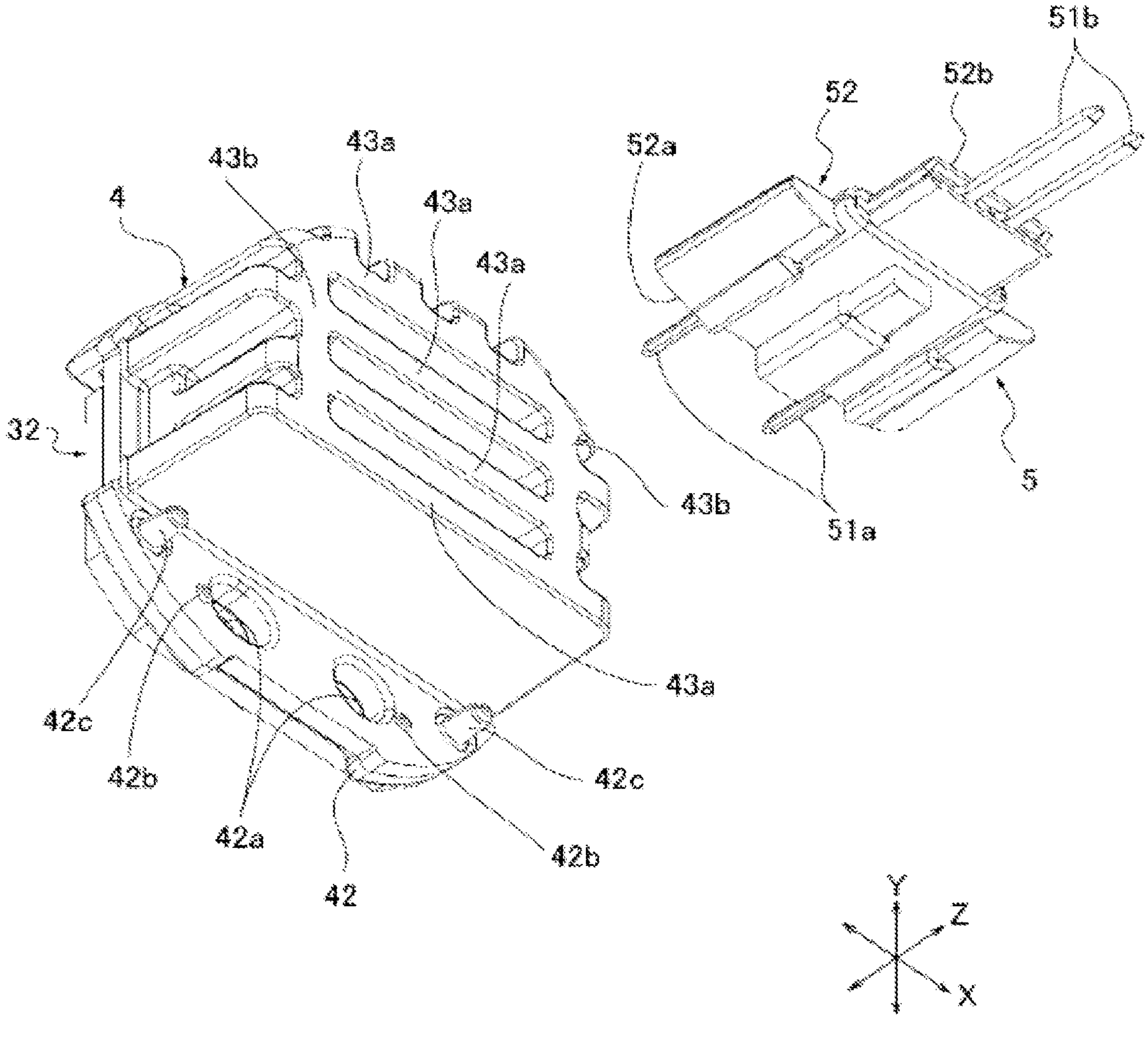
FIG. 4 is a back exploded perspective view illustrating a heat sink and a light source-side connector provided in the light source unit of the present disclosure.

The light source-side connector 5 generates a light source-side power supply path to the circuit board 32 and is fixed in a built-in state at a bottom of the socket 7, as illustrated in FIG. 3 and FIG. 4. The light source-side connector 5 has a pair of power supply-side terminal bars 51*a*, a pair of power source-side terminal bars 51*b*, and a power supply insulating portion 52. The pair of power supply-side terminal bars 51*a* protrude from one end surface 52*a* of the power supply insulating portion 52 and are inserted into the pair of terminal connection hole portions 32*c* through the pair of terminal insertion hole portions 42*a*. The power supply-side terminal bars 51*a* are fixed to the terminal connection hole portions 32*c* by soldering tips thereof. The pair of power source-side terminal bars 51*b* protrude from other end surface 52*b* of the power supply insulating portion 52 and are electrically connected to the power source-side connector 6.

The power source-side connector 6 generates a power source-side power supply path to the circuit board 32 and is fixed to the socket 7 by fitting to the socket 7 behind and below a socket heat dissipation portion 72 (described below) (see FIG. 1). The power source-side connector 6 has one end connected to the light source-side connector 5, and the other end connected to the harness 16. That is, the light source-side connector 5, the power source-side connector 6, and the harness 16 form the power supply path from the power source to the circuit board 32.

The socket 7 incorporates the heat sink 4 and has a heat dissipation function to dissipate heat conducted from the heat sink 4 to the outside. As illustrated in FIG. 2 and FIG. 3, the heat sink 4 with the light source 3 on the front side in the optical axis direction is incorporated by fitting. The socket 7 is formed of a resin material with high thermal conductivity, and integrally includes the socket main body 71 provided on the front side in the optical axis direction and the socket heat dissipation portion 72 provided on the back side in the optical axis direction.

The socket main body 71 is the part into which the heat sink 4 is incorporated. The socket main body 71 has the peripheral wall 71*a*, the flange wall 71*b*, the attachment protrusions 71*d*, a groove portion 71*e*, a pair of positioning holes 71*g*. The peripheral wall 71*a* is formed in a cylindrical shape extending in the optical axis direction. The flange wall 71*b* is formed by a stepped surface extending in the outer radial direction from the back side of the peripheral wall 71*a*. The attachment protrusions 71*d* are formed in projecting shapes protruding in the outer radial direction from four locations on the peripheral wall 71*a*. The groove portion 71*e* is formed inside the cylindrical peripheral wall 71*a* and is a part into which the fin portion 43 of the heat sink 4 is fitted, and is formed in an inverted shape of the fin portion 43. The groove portion 71*e* is coated with thermal conductive grease 100. Each positioning hole 71*g* is formed in such a shape as to allow insertion of the second protrusion 42*c*.

The socket heat dissipation portion 72 is a part that functions to dissipate heat to the outside and has socket fins 72*a* made of a plurality of vertical plates protruding to the back side in the optical axis direction. A plurality of the vertical plates composing the socket fins 72*a* are provided in parallel with predetermined intervals in the width direction to ensure a large heat exchange area with the outside.

Now, essential configurations of the light emitting portion 31, the circuit board 32, the bonding wires 33, and the heat sink 4 will be described with reference to FIG. 5 to FIG. 8.

Figure 5:
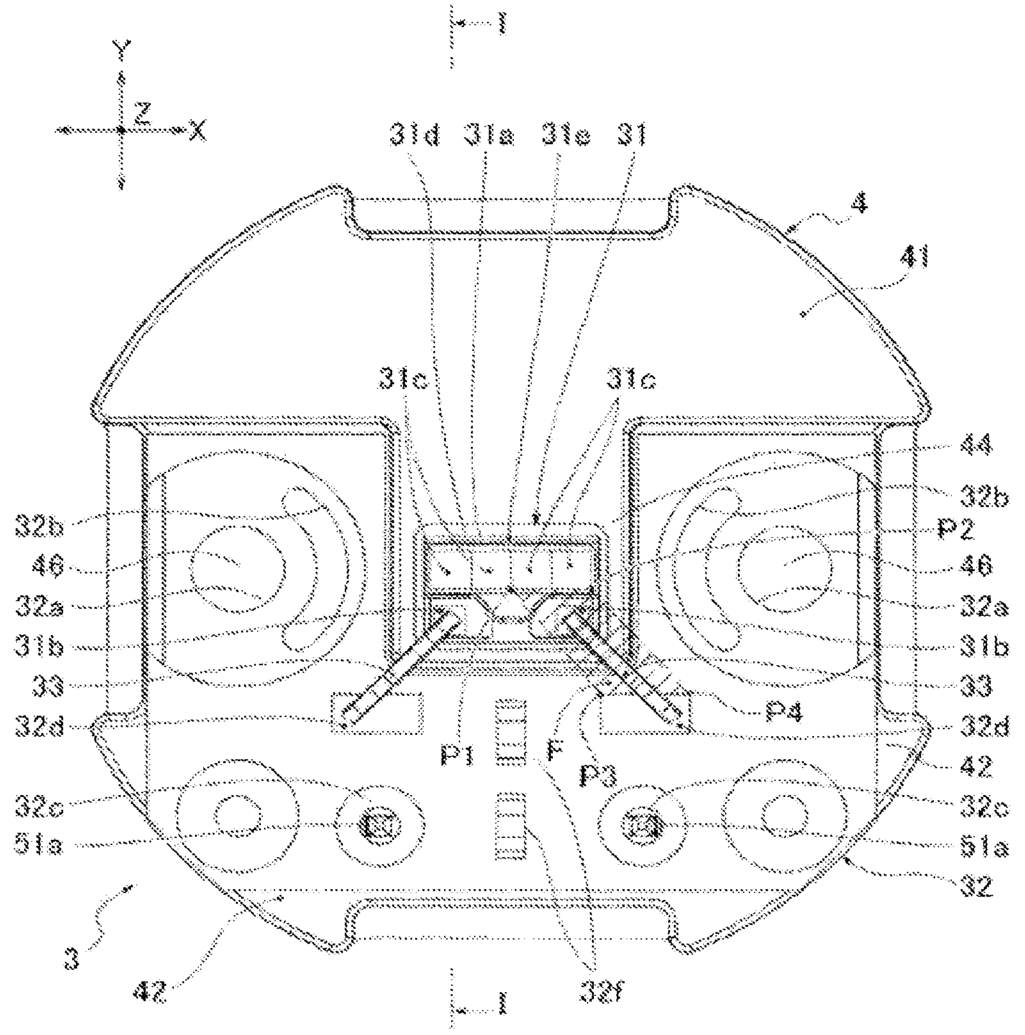
FIG. 5 is a front view illustrating a light emitting portion, a circuit board, and the heat sink provided in the light source unit of the present disclosure.
Figure 6:
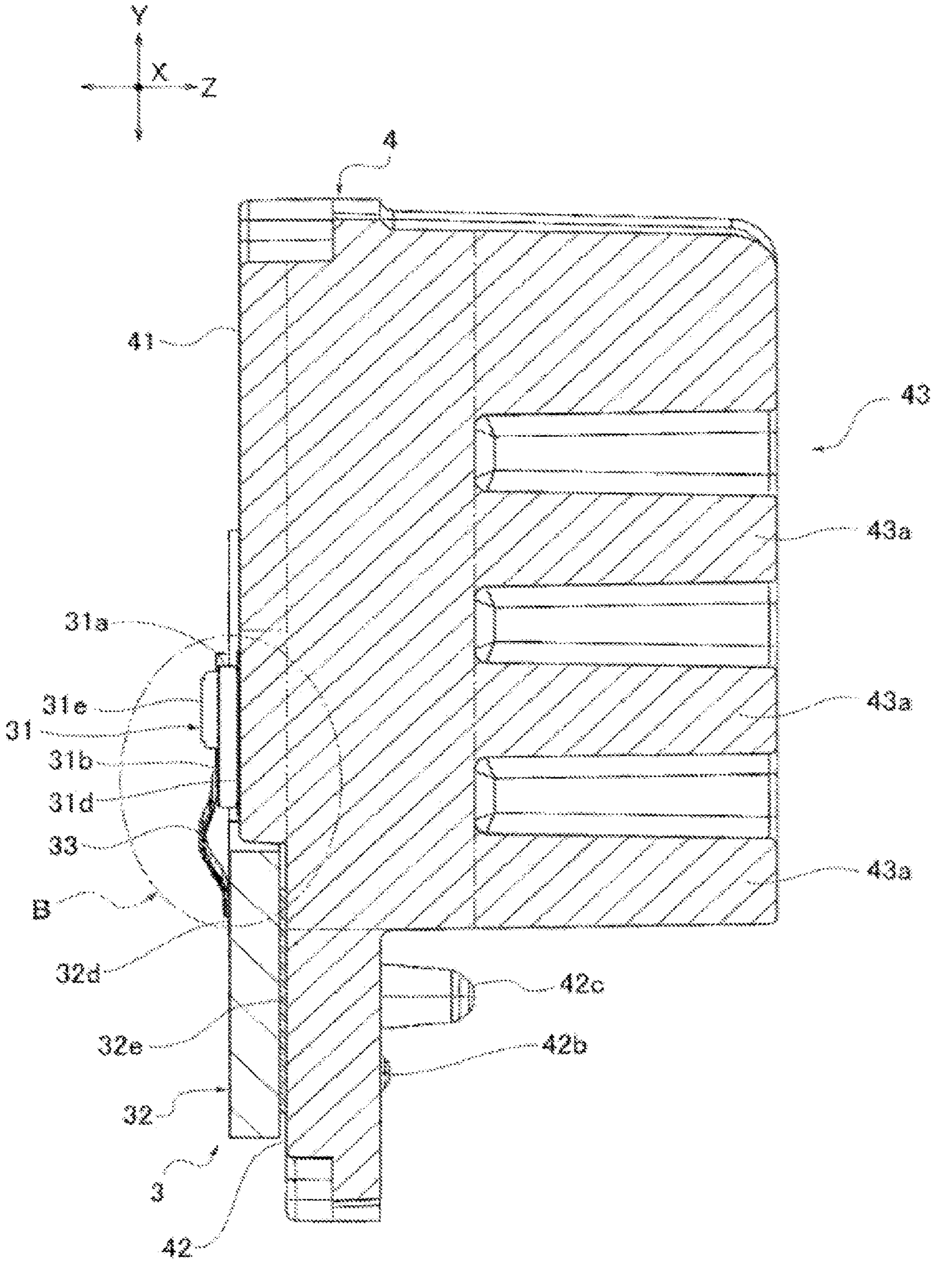
FIG. 6 is a sectional view taken along an I-I line in FIG. 5, illustrating the light emitting portion, the circuit board, and the heat sink provided in the light source unit of the present disclosure.

As illustrated in FIG. 5 and FIG. 6, the light emitting portion 31 includes the submount substrate 31*a*, the pair of light emitting portion-side terminals 31*b*, the light emitting chips 31*c*, the thermally conductive adhesive layer 31*d*, and the light emitting surface 31*e*.

The submount substrate 31*a* is formed in a rectangle viewed from the front side in the optical axis direction, and the pair of light emitting portion-side terminals 31*b* and the light emitting chips 31*c* are fixed to the front side of the board in the optical axis direction. This submount substrate 31*a* is provided with an electrical circuit that electrically connects the light emitting portion-side terminals 31*b* to a semiconductor device that emits light.

The pair of light emitting portion-side terminals 31*b* are square-shaped LED electrode terminals to which one ends of the bonding wires 33 are bonded, and are located and fixed at the front and lower left and right positions of the submount substrate 31*a*.

Each light emitting chip 31*c* incorporates a light-emitting diode (LED), emits light from the rectangular light emitting surface 31*e* with the width direction as a long side in front view, and is disposed and fixed at the front upper side of the submount substrate 31*a*. When the light emitting chips 31*c* are applied to a vehicle lamp that uses the light guide member described above, the light emitting surface 31*e* of the light emitting chips 31*c* are each disposed at a position close to an incident surface of the light guide member. Herein, the light emitting elements incorporated into the light emitting chips 31*c* are not limited to LEDs, but may also be other self-luminous semiconductor devices such as LD chips (laser diode chips) and EL (organic EL). In Embodiment 1, as illustrated in FIG. 5, the four light emitting chips 31*c* are mounted in a horizontal arrangement, and the overall four light emitting chips 31*c* are covered by the rectangular light emitting surface 31*e*. However, the number of the light emitting chips 31*c* is not limited to four, as long as one or more are used in the example. When a plurality of the light emitting chips 31*c* are used, the arrangement is not limited to horizontal arrangement, but can also be vertical arrangement, or combination of horizontal arrangement and vertical arrangement.

The thermally conductive adhesive layer 31*d* adheres and fixes the submount substrate 31*a* to the front surface of the heat sink 4, and is an adhesive layer formed by a thermally conductive adhesive having thermal conductivity. Herein, the thermally conductive adhesive refer to adhesives that are composites of epoxy, silicone, acrylic, or other resin adhesives with metals or ceramics with high thermal conductivity added as fillers.

As illustrated in FIG. 5 and FIG. 6, the circuit board 32 includes the pair of caulking hole portions 32*a*, the pair of curved hole portions 32*b*, the pair of terminal connection hole portions 32*c*, the pair of board-side terminals 32*d*, and the adhesive sheet 32*e*.

The pair of caulking hole portions 32*a* are provided one by one on the left and right sides of a board cutout portion 32*g*. The positioning protrusion portion 46 of the heat sink 4 is inserted into each of the caulking hole portions 32*a* and the tips of the positioning protrusion portions 46 are crushed and deformed, so that the circuit board 32 is caulked and fixed to the heat sink 4.

The pair of curved hole portions 32*b* are each provided at a position between one of the pair of caulking hole portions 32*a* and the substrate cutout portion 32*g*, and are each formed in a curved shape in a predetermined angular range.

The pair of terminal connection hole portions 32*c* are provided left and right below the board cutout portion 32*g*. The respective terminal connection hole portions 32*c* are provided at such corresponding positions as to overlap the left and right terminal insertion hole portions 42*a* in the optical axis direction when the circuit board 32 is mounted on the front surface of the heat sink 4. The power supply-side terminal bars 51*a* are each inserted into the terminal connection hole portion 32*c*. On the front side of each of the terminal connection hole portions 32*c*, the terminal connection hole portion 32*c* and the power supply-side terminal bar 51*a* are electrically connected via soldering (not illustrated).

The pair of board-side terminals 32*d* are provided left and right between the board cutout portion 32*g* and the terminal connection hole portions 32*c* that are disposed in the vertical direction, and are each a rectangular board pad terminal, to which the other end of the bonding wire 33 is bonded. The pair of board-side terminals 32*d* are located on the outer sides in the width direction with respect to the positions of the pair of light emitting portion-side terminals 31*b* in a state in which the light emitting portion 31 and the circuit board 32 are mounted on the heat sink 4.

The adhesive sheet 32*e* is a sheet that fixes the circuit board 32 to the front of the heat sink 4, and is a tape form sheet made of a material such as an epoxy resin adhesive, a silicone resin adhesive, and an acrylic resin adhesive (see FIG. 3). In the adhesive sheet 32*e*, parts corresponding to the caulking hole portions 32*a* of the circuit board 32, the curved hole portions 32*b*, and the terminal connection hole portions 32*c* are cut out. The adhesive sheet 32*e* may be in a liquid form, a fluid form, or the like, instead of the tape form.

The pair of bonding wires 33 have both ends that are bonded to the light emitting portion-side terminals 31*b* and the board-side terminals 32*d* by a wire bonding method using ultrasonic vibration, and are made of a strip-shaped metal material (e.g., a strip-shaped aluminum material). By bonding the bonding wires 33, the two sets of terminal assemblies by the light emitting portion-side terminals 31*b* and the board-side terminals 32*d* are electrically connected to each other via the pair of bonding wires 33. Herein, the "wire bonding method" refers to a method of solid-phase bonding by preparing a processing environment using a jig and applying ultrasonic vibration from a bonding capillary, and has an advantage of less material degeneration because bonding is possible at a low temperature.

The heat sink 4 divides the circular front region into the first region 41 for directly fixing the light emitting portion 31 and the second region 42 for directly fixing the circuit board 32.

As illustrated in FIG. 5, the first region 41 is divided into a T-shaped region, which is combination of a first arcuate region that is above a front circular region of the heat sink 4 in front view, and a first rectangular region that extends downward from the center of the first arcuate region.

As illustrated in FIG. 5, the second region 42 is divided into a U-shaped region, which is combination of a second arcuate region that is below the front circular region of the heat sink 4 in front view, and a pair of second rectangular regions extending upward from the left and right sides of the second arcuate region, respectively.

When the light emitting portion 31 is fixed in the first region 41 and the circuit board 32 is fixed in the second region 42, the light emitting portion 31 is fixed directly to a position on the lower side of the first rectangular region, which is the center of the front circular region of the heat sink 4 in the T-shaped first region 41. The circuit board 32 is fixed directly to almost the overall region of the U-shaped second region 42. A region where the first arcuate region above the front circular region is combined with the upper side of the first rectangular region in the first region 41 of the heat sink 4 is a region where the front of the heat sink 4 is exposed.

Next, position setting of the light emitting portion-side terminals 31*b* provided on the light emitting portion 31 in front view will be described with reference to FIG. 5. The light emitting portion-side terminals 31*b* are disposed between the light emitting surface 31*e* that covers the light emitting chips 31*c*, and the board-side terminals 32*d*, in front view. In other words, the light emitting portion-side terminal 31*b* on the right side in front view is located in a region F surrounded by connecting four points, namely, a point P1 at the center in the left-right direction of the light emitting surface 31*e*, an end point P2 at a lower right side of the light emitting surface 31*e*, and both end points P3 and P4 at an upper side of the board-side terminal 32*d*, and also within the submount substrate 31*a*. The light emitting portion-side terminal 31*b* on the left side in front view is disposed in a similar manner. That is, when setting positions of the light emitting surface 31*e* and the board-side terminals 32*d* are predetermined, the arrangement of the light emitting portion-side terminals 31*b* are set such that the both ends of each of the bonding wires 33 are bonded and fixed to the light emitting portion-side terminal 31*b* and the board-side terminal 32*d*, and the bonding wires 33 do not cross over the light emitting surface 31*e*, or pass over the light emitting surface 31*e*.

Figure 7:
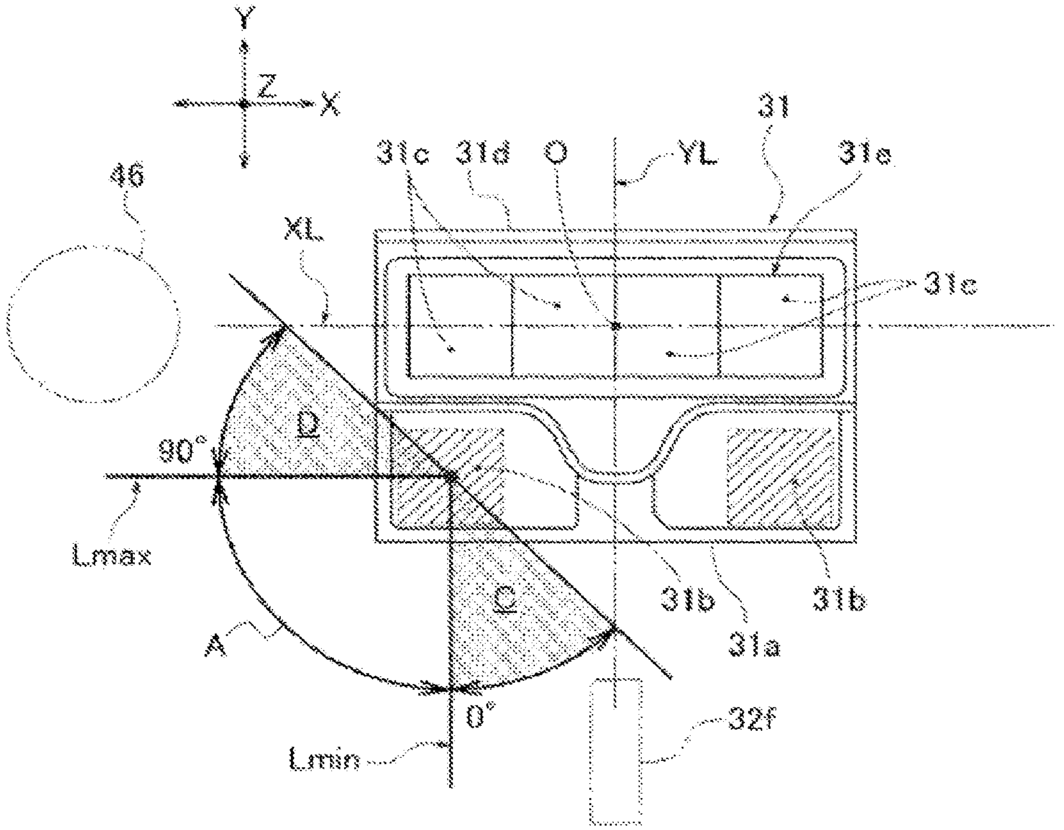
FIG. 7 is a front view of the light emitting portion, illustrating a bonding range which is an allowable angle range in front view for setting a bonding wire of the present disclosure.

Now, an angular range in front view for setting each bonding wire 33 will be described with reference to FIG. 7. First, an angular range that is an allowable angle range in front view for setting the bonding wire 33, and that is set by a minimum angle line Lmin and a maximum angle line Lmax passing a bonding center position of the light emitting portion-side terminal 31*b* is defined as a bonding range A (see FIG. 7). At this time, the minimum angle line Lmin (line at angle=0°) of the bonding range A is set by a first parallel line parallel to a vertical line YL passing through a center position O of the light emitting surface 31*e*. The maximum angle line Lmax (line at angle=90°) of the bonding range A is set by a second parallel line parallel to a horizontal line XL passing through the center position O of the light emitting surface 31*e*.

The angle in front view of the bonding wire 33 is set to an angle included in the bonding range A and in an intermediate angular range between the minimum angle line Lmin and the maximum angle line Lmax (i.e., angle=about 45°±10°). That is, when the both respective ends of the bonding wire 33 are bonded to the light emitting portion-side terminal 31*b* and the board-side terminal 32*d*, the setting angle of the bonding wire 33 is set such that the bonding wire is disposed to be the farthest from a bonding inhibition range C on the minimum angle line Lmin side and a bonding inhibition range D on the maximum angle line Lmax side. Herein, the "bonding inhibition range C" is preferably set to a range extended by about 45° from the minimum angle line Lmin to the minus side. The "bonding inhibition range D" is preferably set to a range extended by about 45° from the maximum angle line Lmax to the plus side.

Now, a height relationship among heights in side view perpendicular to the optical axis of the light emitting portion-side terminal 31*b*, the board-side terminal 32*d*, and the light emitting surface 31*e* will be described with reference to FIG. 8. The height h2 in side view of the light emitting portion-side terminal 31*b* is set lower than the height h1 in side view of the light emitting surface 31*e*. The height h2 in side view of the light emitting portion-side terminal 31*b* is set to the same position as the height h3 in side view of the board-side terminal 32*d*, or a position higher than the height h3 in side view of the board-side terminal 32*d* (h1>h2≥h3). That is, the relationship between the height h2 of the light emitting portion-side terminal 31*b* and the height h3 of the board-side terminal 32*d* in side view is set in consideration of preventing interference between the bonding wire 33 and peripheral members (such as light guide member) disposed close to the front side in the optical axis direction of the light emitting surface 31*e*, and a height difference (h2–h3) should be 0 (zero) or more.

Figure 8:
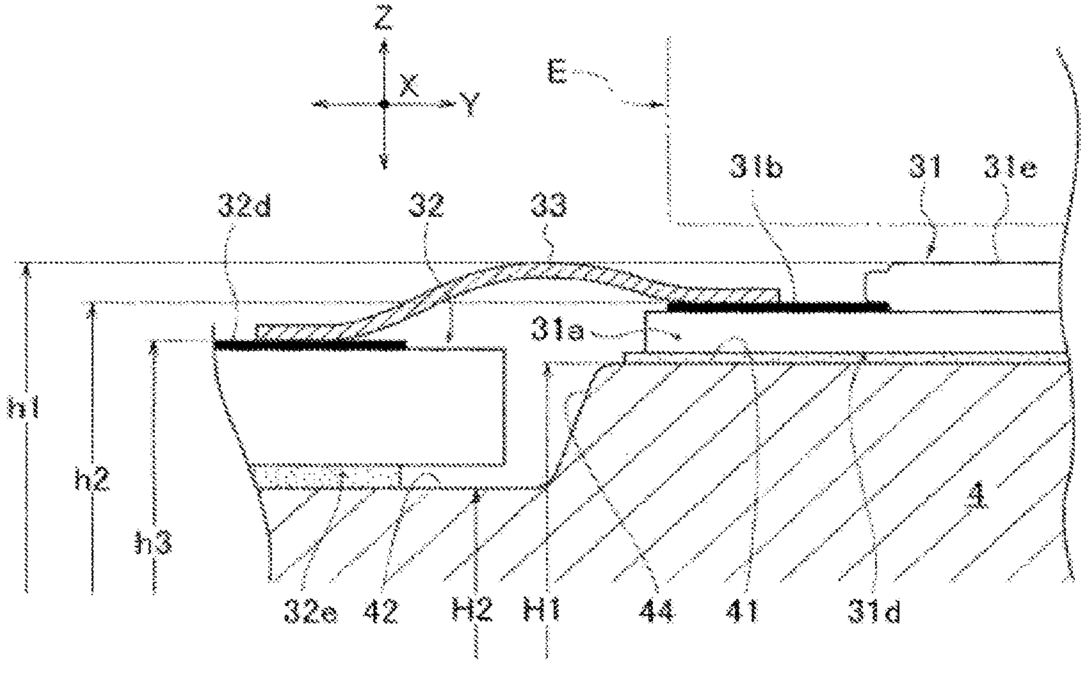
FIG. 8 is an enlarged sectional view of a part B in FIG. 6, which illustrates a height relationship among respective heights in side view of a light emitting portion-side terminal, a board-side terminal hole portion, and a light emitting surface of the present disclosure.

In Embodiment 1, as illustrated in FIG. 8, the bonding wire 33 keeps the height protruding in the optical axis direction lower, and therefore the height h2 of the light emitting portion-side terminal 31*b* is set lower than the height h1 of the light emitting surface 31*e*, and higher than the height h3 of the board-side terminal 32*d* (h1>h2>h3). Herein, when a reference surface (h=0) is set at a predetermined position on the far side in the optical axis direction from the front of the heat sink 4, the "height h" refers to the height from the reference surface to the light emitting surface 31*e* in the case of the height h1 of the light emitting surface 31*e*, and refers to the height from the reference surface to the surface of each of the terminals 31*b* and 32*d* in the case of the height h2 of the light emitting portion-side terminal 31*b* and the height h3 of the board-side terminal 32*d*.

The first region 41 and the second region 42 of the heat sink 4 are connected by an inclined surface 44, and forms a stepped surface with different heights of the region surfaces. The stepped surface is set such that a height H1 in side view of the first region 41, to which the light emitting portion 31 is fixed, is higher than a height H2 in side view of the second region 42, to which the circuit board 32 is fixed (H1>H2).

The stepped surface is set such that the height H1 in side view of the first region 41, to which the light emitting portion 31 is fixed, is higher than the height H2 in side view of the second region 42, so that the thickness in the optical axis direction of the first region 41 in the heat sink 4 is thicker than the thickness in the optical axis direction of the second region 42 (see FIG. 6). Herein, when a reference surface (H=0) is set at a predetermined position from the front of the heat sink 4 toward the back side in the optical axis direction, the "height H" refers to the height from the reference surface to the surface of the first region 41 in the case of the height H1 in side view of the first region 41. In the case of the height H2 in side view of the second region 42, the "height H" refers to the height from the reference surface to the surface of the second region 42.

Now, actions in Embodiment 1 will be divided into a "light source unit assembly action", a "light source unit heat dissipation action", and "light source unit characteristic action" to be described.

The assembly action of the light source unit 2 will be described. First, as illustrated in FIG. 3, the light source-side connector 5 is inserted and fixed to the socket 7 by fitting.

Now, the light emitting portion 31 is attached to the heat sink 4. At this time, the light emitting portion 31 is fixed directly to the first region 41 of the heat sink 4 by a thermal conductive adhesive. The circuit board 32 is then fixed directly to the second region 42 of the heat sink 4 by the adhesive sheet 32*e*. Next, the positioning protrusion portions 46 of the heat sink 4 are inserted into the caulking hole portions 32*a* of the circuit board 32 and caulked by crushing the tips of the positioning protrusion portions 46. Consequently, the circuit board 32 is caulked and fixed to the heat sink 4. Next, the both ends of the bonding wires 33 are bonded to the left and right light emitting portion-side terminals 31*b* and the left and right board-side terminals 32*d* by the wire bonding method using ultrasonic vibration.

The heat sink 4, to which the light emitting portion 31, the circuit board 32, and the bonding wires 33 are attached, is then fixed to the socket 7 to be assembled. At this time, the groove portion 71*e* of the socket 7 is coated with the thermal conductive grease 100. Next, the second protrusions 42*c* of the heat sink 4 are inserted into the positioning holes 71*g* of the socket 7. The heat sink 4 and the socket 7 are then fixed together with an adhesive. During this fixing operation, the fin portion 43 of the heat sink 4 is progressively fitted into the groove portion 71*e* of the socket 7, due to the positioning action of the second protrusions 42*c* of the heat sink 4 and the positioning holes 71*g* of the socket 7.

Then, on the front side of the circuit board 32, the power supply-side terminal bars 51*a* of the light source-side connector 5 and the terminal connection hole portions 32*c* of the circuit board 32 are soldered so as to be electrically connected to each other. The light source unit 2 is assembled via the assembly procedure described above.

In recent years, the use of LEDs in vehicle lamps has been increasing, and the demand for higher output and higher brightness with a single LED is increasing due to miniaturization and reduction in the number of components through new designs. However, the high power output of LEDs results in high heat generation, and more efficient heat dissipation performance is desired.

The light emitting portion 31 of the light source unit 2 is directly fixed to the first region 41 of the heat sink 4 by a thermally conductive adhesive. In other words, a heat sink mounting structure in which the LEDs are mounted directly on the heat sink 4 is employed. Therefore, the heat generated from the light emitting portion 31 is directly conducted to the heat sink 4. The heat conducted to the heat sink 4 is then conducted from the fin portion 43 of the heat sink 4 to the socket 7. At this time, the fin portion 43 of the heat sink 4 and the groove portion 71*e* of the socket 7 are close to each other through the thermal conductive grease 100, and therefore the heat from the heat sink 4 is efficiently conducted to the socket 7. The heat conducted to the socket 7 is then dissipated to the outside from the socket heat dissipation portion 72 of the socket 7.

Thus, the light source unit 2 has the heat sink mounting structure of the light emitting portion 31, and therefore heat dissipation performance is improved compared to a board mounting structure of the light emitting portion. Herein, the board mounting structure of the light emitting portion refers to a structure in which the LED light emitting chip, which is the light emitting portion, is provided on an upper surface of the circuit board, as described, for example, in Japanese Patent Laid-open No. 2013-247062.

In Embodiment 1, the first region 41 and the second region 42 form the stepped surface in which the first region 41 is higher, and the heat sink thickness in the optical axis direction of the first region 41, to which the light emitting portion 31 is directly fixed, is thicker than the heat sink thickness of the second region 42, to which the circuit board 32 is directly fixed.

Accordingly, in the heat sink 4, the heat capacity of the first region 41, to which the light emitting portion 31 is directly fixed, is larger than that of the second region 42. Therefore, when heat generation from the light emitting portion 31 continues and the temperature of the light emitting portion 31 is about to rise due to heat balance in which an amount of heat generated is greater than an amount of heat dissipated, the amount of heat dissipated by the heat sink 4 is higher than that in a case where the heat sink thicknesses are the same. As a result, the difference between the amount of heat generated by the light emitting portion 31 and the amount of heat dissipated by the heat sink 4 is kept small, and it is possible to effectively suppress the temperature rise of the light emitting portion 31.

In Embodiment 1, the light emitting portion-side terminals 31*b* provided in the light emitting portion 31, and the board-side terminals 32*d* provided in the circuit board 32 are electrically connected by the bonding wires 33. At this time, the light emitting portion-side terminals 31*b* are disposed between the light emitting surface 31*e*, which covers the light emitting chips 31*c*, and the board-side terminals 32*d* in front view.

That is, the positions of the light emitting portion-side terminals 31*b* are determined with the set position of the light emitting surface 31*e* and the set positions of the board-side terminals 32*d* as a reference. Therefore, when the both ends of each of the bonding wires 33 are bonded and fixed to the light emitting portion-side terminal 31*b* and the board-side terminal 32*d*, the bonding wires 33 are disposed at such positions as to diverge from the light emitting surface 31*e* without interfering with the light emitting surface 31*e*. Accordingly, the bonding wires 33 do not cross over the light emitting surface 31*e* or do not interfere with a part of the light emitting surface 31*e*. As a result, the bonding wires 33 can be prevented from blocking light emitted from the light emitting surface 31*e*.

In Embodiment 1, the allowable angular range in the front view for setting the bonding wire 33, and the angular range set by the minimum angle line Lmin and the maximum angle line Lmax passing through the bonding center position of the light emitting portion-side terminal 31*b* refers to the bonding range A. At this time, the minimum angle line Lmin of the bonding range A is set by the first parallel line parallel to the vertical line YL passing through the center position O of the light emitting surface 31*e*.

That is, in Embodiment 1, the minimum angle line Lmin of the bonding range A is set by the first parallel line parallel to the vertical line YL passing through the center position O of the light emitting surface 31*e*, so that the pair of bonding wires 33 are set at such angles as to open more widely with respect to the vertical parallel arrangement in the up-down direction in front view. Therefore, the pair of bonding wires 33 can be prevented from intersecting each other. In addition, it is possible to prevent interference with peripheral unit components (e.g., the capacitors 32*f* or the like), which are located at such inner positions that the pair of bonding wires 33 approach each other (see FIG. 7).

In Embodiment 1, the maximum angle line Lmax of the bonding range A is set by the second parallel line parallel to the horizontal line XL passing through the center position O of the light emitting surface 31*e*.

That is, in Embodiment 1, the maximum angle line Lmax of the bonding range A is set by the second parallel line parallel to the horizontal line XL passing through the center position O of the light emitting surface 31*e*, so that the pair of bonding wires 33 are set at such angles as to close with respect to a straight line arrangement extended in the horizontal direction in the front view. Therefore, it is possible to prevent interference with peripheral unit components (e.g., the positioning protrusion portions 46 for fixing the circuit board 32 to the heat sink 4, or the like) that are located at such outer positions that the pair of bonding wires 33 are separated from each other (see FIG. 7).

In Embodiment 1, the angle in front view of each bonding wire 33 is set to the angle included in the bonding range A and in the intermediate angular range between the minimum angle line Lmin and the maximum angle line Lmax.

That is, in Embodiment 1, the bonding wires 33 are each set at the angle in the intermediate angular range of the minimum angle line Lmin and the maximum angle line Lmax, so that the pair of bonding wires 33 are set by angular arrangement in which the pair of bonding wires 33 are opened at about 45° on the both sides in front view (=truncated chevron shape arrangement), as illustrated in FIG. 5. Therefore, the pair of bonding wires 33 are located at the most deviated positions from the capacitor 32*f* and the positioning protrusion portions 46 that are the peripheral unit components. Accordingly, a region where the jig to be used in the wire bonding method is set is secured, and a sufficient distance is secured between a bonding capillary and the peripheral unit components is secured. As a result, the interference between the pair of bonding wires 33 and the peripheral unit components can be reliably prevented. In addition, bonding work using the wire bonding method can be performed smoothly without any problems.

In Embodiment 1, the height h2 in side view of the light emitting portion-side terminal 31*b* is set lower than the height h1 in side view of the light emitting surface 31*e*. The height h2 in side view of the light emitting portion-side terminal 31*b* is set higher than the height h3 in side view of the board-side terminal 32*d*.

That is, in Embodiment 1, the light emitting portion-side terminals 31*b* and the board-side terminals 32*d* are disposed further away from the peripheral members than the light emitting surface 31*e*. Therefore, the bonding wires 33 connecting the light emitting portion-side terminals 31*b* and the board-side terminals 32*d* are disposed such that the deviation distance from the peripheral members (such as a light guide member E) is secured even when the bonding wires 33 are each in such a curved state as to protrude in the optical axis direction, as illustrated in FIG. 8. As a result, when peripheral members such as the light guide member E and an inner lens are placed close to the front side of the light emitting surface 31*e* in the optical axis direction, the bonding wires 33 can be prevented from interfering with the peripheral members such as the light guide member E and the inner lens. In particular, in application to the vehicle lamp 1, the light source unit 2 is mounted while rotating, and therefore it is possible to prevent interference with peripheral members when the light source unit 2 is mounted.

In Embodiment 1, the first region 41 and the second region 42 of the heat sink 4 are formed on the stepped surface, the stepped surface is set such that the height H1 in the side view of the first region 41, to which the light emitting portion 31 is fixed, is higher than the height H2 in the side view of the second region 42, to which the circuit board 32 is fixed.

That is, in Embodiment 1, the first region 41 and the second region 42 of the heat sink 4 are formed on the stepped surface, the height H1 of the first region 41 is set higher than the height H2 of the second region 42. Therefore, when the light emitting portion 31 is fixed to the surface of the first region 41 and the circuit board 32 is fixed to the surface of the second region 42, the relationship among the height h1 in side view of the light emitting surface 31*e*, the height h2 in side view of the light emitting portion-side terminals 31*b*, and the height h3 in side view of the board-side terminals 32*d* (h1>h2≥h3) is established. Accordingly, it is possible to easily obtain the setting of the relationship of the heights h1, h2, and h3 in side view that can prevent interference between the peripheral members and the pair of bonding wires 33 that are disposed close to the front side in the optical axis direction of the light emitting surface 31*e*, without requiring any device by setting the light emitting portion or the thickness of the board. In addition, the height H1 in side view of the first region 41 is set higher than the height H2 in side view of the second region 42, so that the thickness of the heat sink 4 in the first region 41, to which the light emitting portion 31 is fixed, can be made thicker than that in the second region 42, and it is possible to achieve further improvement of heat dissipation efficiency.

As described above, the vehicle lamp 1 in Embodiment 1 has the following effects.

(1) In the vehicle lamp 1 including the light emitting portion 31 having the light emitting element, the circuit board 32, and the heat sink 4, the front region of the heat sink 4 is divided into the first region 41 and the second region 42, the light emitting portion 31 is fixed to the first region 41, and the circuit board 32 is fixed to the second region 42, the light emitting portion-side terminals 31*b* provided in the light emitting portion 31 and the board-side terminals 32*d* provided in the circuit board 32 are electrically connected by the bonding wires 33, and the light emitting portion-side terminals 31*b* are disposed between the light emitting surface 31*e* that covers the light emitting element, and the board-side terminals 32*d* in front view. Therefore, it is possible to prevent the bonding wires 33 from blocking light emitted from the light emitting surface 31*e* while improving heat dissipation performance from the light emitting portion 31.

(2) When the angular range that is the allowable angle range in front view for setting each bonding wire 33, and that is set by the minimum angle line Lmin and the maximum angle line Lmax passing through the bonding center position of the light emitting portion-side terminal 31*b* refers to the bonding range A, the minimum angle line Lmin of the bonding range A is set by the first parallel line parallel to the vertical line YL passing through the center position O of the light emitting surface 31*e*. Therefore, the pair of bonding wires 33 can be prevented from intersecting each other, and it is possible to prevent interference with the peripheral unit components which are located at such inner positions that the pair of bonding wires 33 approach each other.

(3) The maximum angle line Lmax of the bonding range A is set by the second parallel line parallel to the horizontal line XL passing through the center position O of the light emitting surface 31*e*. Therefore, it is possible to prevent interference with the peripheral unit components that are located at such outer positions that the pair of bonding wires 33 are separated from each other.

(4) The angle in front view of each bonding wire 33 is set to the angle included in the bonding range A and in the intermediate angular range between the minimum angle line Lmin and the maximum angle line Lmax. Therefore, the interference between the pair of bonding wires 33 and the peripheral unit components can be reliably prevented. In addition, bonding work using the wire bonding method can be performed smoothly without any problems.

(5) The height h2 in side view of each light emitting portion-side terminal 31*b* is set lower than the height h1 in side view of the light emitting surface 31*e*. The height h2 in side view of each light emitting portion-side terminal 31*b* is set to the same height position as the height h3 in side view of each board-side terminal 32*d* or set higher than that of each board-side terminal 32*d*. Therefore, when the peripheral members are placed close to the front side in the optical axis direction of the light emitting surface 31*e*, the bonding wires 33 can be prevented from interfering with the peripheral members.

(6) The first region 41 and the second region 42 of the heat sink 4 are formed on the stepped surface, and the stepped surface is set such that the height H1 in side view of the first region 41, to which the light emitting portion 31 is fixed, is higher than the height H2 in side view of the second region 42, to which the circuit board 32 is fixed. Therefore, it is possible to easily obtain the setting of the relationship of the heights that can prevent interference between the peripheral members and the bonding wires 33 that are disposed close to the front side in the optical axis direction of the light emitting surface 31*e*, as the height relationship among the respective heights in side view of the light emitting portion-side terminal 31*b*, the board-side terminal 32*d*, and the light emitting surface 31*e*.

Thus, the vehicle lamp 1 of the present disclosure is described on the basis of Embodiment 1. However, the specific configuration is not limited to Embodiment 1, and design changes, additions, or the like are permitted as long as they do not depart from the gist of the invention claimed in each claim.

In Embodiment 1, as the division arrangement of the light emitting portion 31 and the circuit board 32, the light emitting portion 31 is disposed at the center of the front region of the heat sink 4, and the circuit board 32 is disposed in a region surrounded by the lower portion and the both side portions of the light emitting portion 31. However, the division arrangement of the light emitting portion and the circuit board is not limited to the division arrangement in Embodiment 1, but includes submount type by various division arrangement. For example, the light emitting portion may be disposed at the center of the front region of the heat sink, the circuit board may be disposed in a region surrounded by an upper portion and the both side portions of the light emitting portion. Alternatively, the light emitting portion may be disposed at the center of the front region of the heat sink, and the circuit board may be disposed so as to surround the whole circumference of the light emitting portion. Furthermore, a circuit board may be provided with a plurality of light emitting portion setting holes, and a plurality of light emitting portions may be arranged in scattered locations in the circuit board.

In Embodiment 1, as the heat sink 4, the first region 41 and the second region 42, into which the front region of the heat sink 4 is divided, are formed in the stepped surface. However, as the heat sink, for example, the front region is formed on the same plane, and a boundary line for dividing the first region and the second region in the same plane may be determined.

In Embodiment 1, the angle in front view of each bonding wire 33 is set to the angle included in the bonding range A and in the intermediate angular range of the minimum angle line Lmin and the maximum angle line Lmax. However, the bonding wire angle setting is not limited to the angle setting of Embodiment 1. In short, a bonding range that can be set and an optimal bonding wire setting angle may differ depending on a submount type mode to be used. Accordingly, even an angle outside the bonding range A illustrated in Embodiment 1 may be acceptable as the bonding wire setting angle.

Embodiment 1 shows application to the vehicle lamp 1 including the socket type module light source unit 2 that integrates the light source 3, the heat sink 4, the light source-side connector 5, the power source-side connector 6, and the socket 7. However, the applicable vehicle lamp is not limited to the vehicle lamp including the socket type module light source unit, and a vehicle lamp including at least a light emitting portion, a circuit board, and a heat sink can be applied.

In Embodiment 1, the vehicle lamp 1 of the present disclosure is applied to a reflective type lamp using the reflective surface 13*a* (reflector 13) of a vehicle such as an automobile. However, the vehicle lamp 1 of the present disclosure is not limited to this, but may be applied to a lamp using a projection lens, or may be applied to a light guide type lamp in which a light guide member is disposed in front of the light source (light emitting portion).

DESCRIPTION OF REFERENCE NUMERALS

1 vehicle lamp
2 light source unit
3 light source
31 light emitting portion
31*b* light emitting portion-side terminal
31*e* light emitting surface
32 circuit board
32*d* board-side terminal
33 bonding wire
4 heat sink
41 first region
42 second region
A bonding range
Lmin minimum angle line
Lmax maximum angle line
YL vertical line
XL horizontal line
h1 height in side view of light emitting surface 31*e*
h2 height in side view of light emitting portion-side terminal 31*b*
h3 height in side view of board-side terminal 32*d*
H1 height in side view of first region 41
H2 height in side view of second region 42
X width direction (left-right direction)
Y up-down direction (vertical direction)
Z optical axis direction (front-rear direction)

The invention claimed is:

1. A vehicle lamp comprising:
a light emitting portion having a light emitting element;
a circuit board; and
a heat sink, wherein
a front region of the heat sink is divided into a first region and a second region, the light emitting portion is fixed directly to the first region, and the circuit board is fixed directly to the second region,
a light emitting portion-side terminal provided in the light emitting portion and a board-side terminal provided in the circuit board are electrically connected by a bonding wire, and
the light emitting portion-side terminal is disposed at a position located between a light emitting surface that covers the light emitting element, and the board-side terminal in front view so that the bonding wire connects the light emitting portion-side terminal and the board-side terminal with such an angle in the front view of the bonding wire with respect to a line parallel to a vertical line passing through a center position of the light emitting surface that the bonding wire are located at a position deviated from a peripheral unit component provided on the circuit board.

2. The vehicle lamp according to claim 1, wherein
when an angular range that is an allowable angle range in front view for setting the bonding wire, and that is set by a minimum angle line and a maximum angle line passing through a bonding center position of the light emitting portion-side terminal refers to a bonding range, the minimum angle line of the bonding range is set by a first parallel line parallel to the vertical line passing through the center position of the light emitting surface.

3. The vehicle lamp according to claim 2, wherein
the maximum angle line of the bonding range is set by a second parallel line parallel to a horizontal line passing through the center position of the light emitting surface.

4. The vehicle lamp according to claim 3, wherein
the angle in the front view of the bonding wire is set to an angle included in the bonding range and in an intermediate angular range between the minimum angle line and the maximum angle line.

5. The vehicle lamp according to claim 1, wherein
a height in side view of the light emitting portion-side terminal is set lower than a height in side view of the light emitting surface, and
the height in side view of the light emitting portion-side terminal is set to a same height position as a height in side view of the board-side terminal or set higher than that of the board-side terminal.

6. The vehicle lamp according to claim 5, wherein
the first region and the second region of the heat sink are formed on a stepped surface, and
the stepped surface is set such that a height in side view of the first region, to which the light emitting portion is fixed, is higher than a height in side view of the second region, to which the circuit board is fixed.

* * * * *